Figure 1:
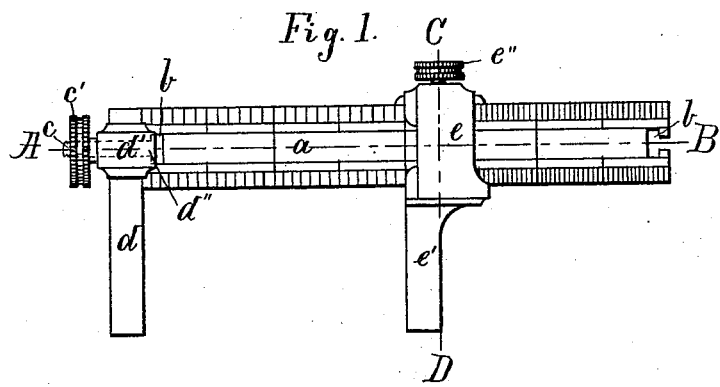

F. D. HAZELTON.
GAGE.

No. 184,524.  Patented Nov. 21, 1876.

Witnesses:
Henry Chadbourn.
F. Allen.

Inventor:
Frederick D. Hazelton.
by
Alban Andrén
his atty.

UNITED STATES PATENT OFFICE.

FREDERICK D. HAZELTON, OF BOSTON, MASSACHUSETTS.

IMPROVEMENT IN GAGES.

Specification forming part of Letters Patent No. 184,524, dated November 21, 1876; application filed August 14, 1876.

*To all whom it may concern:*

Be it known that I, FREDERICK D. HAZELTON, of Boston, in the county of Suffolk and State of Massachusetts, have invented certain new and useful Improvements in Caliper-Squares; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to improvements in caliper-squares for the purpose of measuring external diameters of shafts or cylindrical pieces, as well as for the purpose of squaring and measuring rectangular, square, or similar pieces of work that commonly occur in machine-shops or other works; and my invention consists of an ordinary graduated scale, provided at each end with a T-headed or similar recess, into which is fitted a T-headed or correspondingly-shaped screw-bolt, that passes through the head of a leg projecting from the extreme end of the scale in a right angle. The head of the said leg is provided with side lips or projections, that form a groove between them, in which the extreme end of the scale fits, at the same time as they serve to prevent the T-head of the screw-bolt from turning around or getting detached from the scale when the thumb-nut that is used on the T-headed bolt is screwed up firmly to secure the square leg to either end of the graduated scale. In combination with the firmly-secured square leg in one end of the scale is used a movable leg, projecting at a right angle from the scale, and made to slide easily in and out on the latter, and provided with a set-screw, by which the said movable leg can be secured in any desired position on the graduated scale.

If it is desired to use the graduated scale as a scale, and not as a caliper-square, I can easily detach both the stationary and movable legs, when the scale can be used in the ordinary manner, it being shown in the drawings that the graduations commence in units from the very extreme ends of the scale, and from the inside of the stationary square-leg, when secured to the end of the graduated scale.

Figure 2:
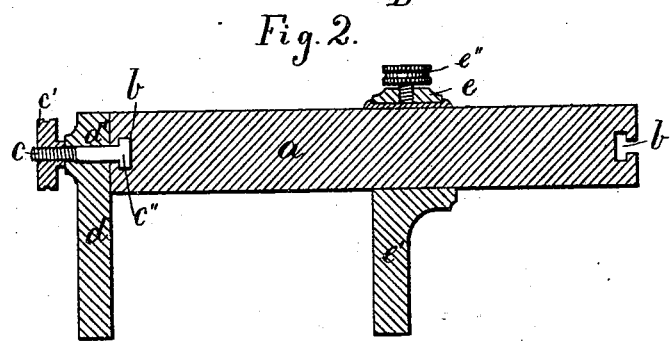
Figure 3:
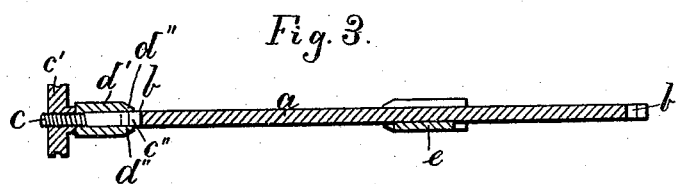
Figure 4:
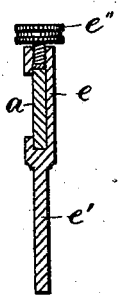

In the accompanying drawings, Figure 1 represents a side elevation of my invention. Fig. 2 represents a longitudinal section. Fig. 3 represents a section on the line A B, shown in Fig. 1; and Fig. 4 represents a cross-section on the line C D, also shown in Fig. 1.

Similar letters refer to similar parts wherever they occur on the different parts of the drawings.

$a$ represents an ordinary metallic graduated scale, the same being divided in inches and different units of inches on four or more edges of the said scale, in the usual manner. The scale $a$ is provided at each of its ends with a T-headed recess, $b$; or it may, to equal advantage, be made dovetailed, or any other of the well-known recesses in which headed bolts are secured. A correspondingly-headed screw-bolt, $c$, projects through the head $d'$ of the square-leg $d$, and the latter is firmly secured to the scale $a$ by means of the thumb-nut $c'$, that encompasses the screw $c$ on the outside of the head $d'$. The head $c''$ of the screw $c$ rests in one of the perforations or recesses $b$, and it is prevented from turning around by means of the lips or projections $d''$ $d''$, that project on each side of the scale $a$ and head $c''$.

The location of the thumb-nut $c'$ in relation to the head $d'$ is not necessarily to be made as shown in Figs. 1 and 2, as, when a true outer square is required at the junction of the leg $d$ and scale $a$, the said thumb-nut can easily be placed in a slotted opening in the former without departing from my invention.

$e$ represents the adjustable head of the leg $e'$, and $e''$ represents an ordinary thumb-screw, by which the head $e$ can be clamped and secured to the scale $a$ in any desired position in the ordinary way.

From the above it will be seen that the stationary leg $d$, as well as the adjustable leg $e'$, can be removed entirely from the scale $a$, when the latter is as useful as any ordinary graduated scale; and, furthermore, that the leg $d$ can be secured to either end of the scale $a$, and can be reversed to either side of the latter, so that the caliper-square can be used on any of the different graduations on the different edges of said scale.

Having thus fully described the nature, construction, and operation of my invention, I wish to secure by Letters Patent, and claim—

In combination with the scale $a$ and its recesses $b\ b$, the stationary leg $d\ d'$, with its projections $d''\ d''$ and bolt $c\ c''$, thumb-nut $c'$, and the sliding leg $e\ e'\ e''$, as and for the purpose set forth and described.

In testimony that I claim the foregoing as my own invention I have affixed my signature in presence of two witnesses.

FREDERICK D. HAZELTON.

Witnesses:
 ALBAN ANDRÉN,
 HENRY CHADBOURN.